Nov. 16, 1965   R. J. TUTTLE   3,218,526
LIQUID LEVEL PROBE
Filed Jan. 27, 1961   3 Sheets-Sheet 1
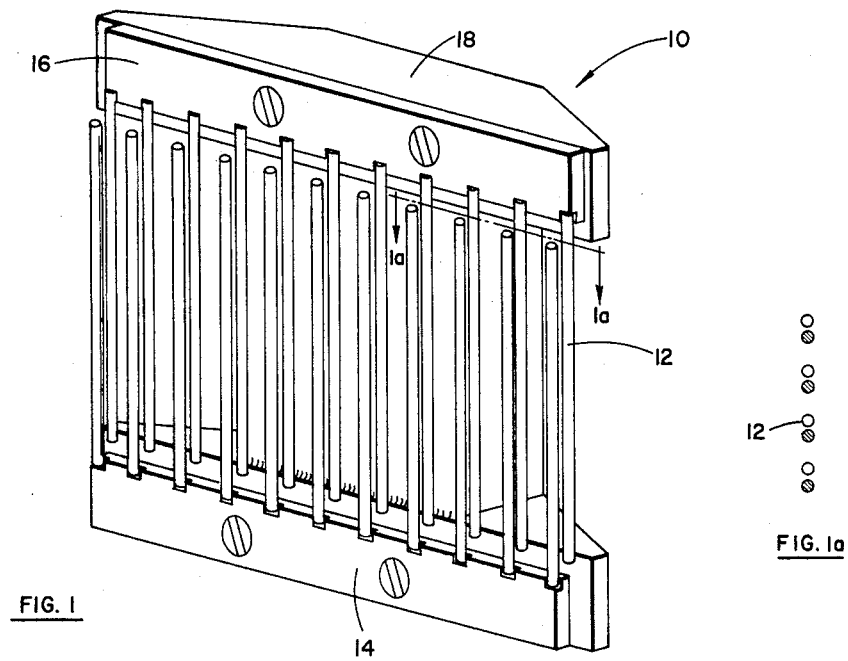
FIG. 1
FIG. 1a
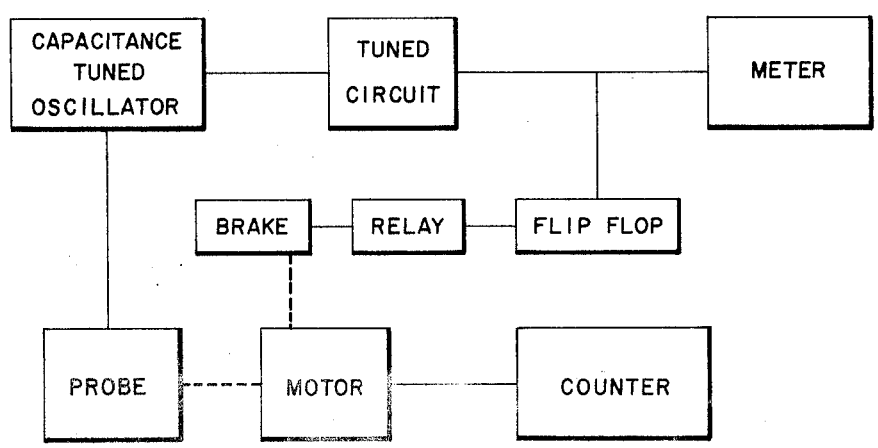
FIG. 2
INVENTOR.
ROBERT J. TUTTLE
BY
*Gerald A. Koris*
ATTORNEY Nov. 16, 1965 R. J. TUTTLE 3,218,526
LIQUID LEVEL PROBE
Filed Jan. 27, 1961 3 Sheets-Sheet 3

INVENTOR.
ROBERT J. TUTTLE
BY Gerald A. Koris
ATTORNEY

United States Patent Office 3,218,526
Patented Nov. 16, 1965

3,218,526
LIQUID LEVEL PROBE
Robert J. Tuttle, Canoga Park, Calif., assignor to
North American Aviation, Inc.
Filed Jan. 27, 1961, Ser. No. 85,275
1 Claim. (Cl. 317—246)

My invention relates to an improved liquid level indicator, and more particularly to a level gauge capacitor probe having a high degree of accuracy.

The typical capacitor-type liquid gauge is normally immersed in the fluid and is designed to give readings as the fluid level changes. Such types of liquid quantity gauges are not highly accurate because the capacitance of the probe immersed in the liquid changes continuously, but not too sharply, over the length of the probe with changing liquid levels. Non-linearity in capacitance change with liquid level change must then be balanced out in the associated electronic circuitry, usually by bridge networks. Such devices are therefore not of great utility in the many research and industrial processes where it is desired to know to a great degree of accuracy (to hundredths or thousandths of an inch) the level of a liquid in a remote or difficultly accessible tank, rather than the actual mass or volume of liquid in the tank.

An object of my present invention is to provide an improved liquid level detector.

It is another object of my invention to provide a high precision, grid-type capacitance probe for use in a liquid level indicator system.

Another object is to provide such a grid-type probe whose capacitance changes sharply upon contacting a fluid.

It is a further object to provide an indicating system which is sharply responsive to a change of capacitance in such a probe.

It is a still further object to provide a liquid level measuring system having a probe whose capacitance changes in a step function upon contacting liquid, and means associated with the probe for indicating a change in capacitance of the probe, thereby indicating the liquid level.

The above and other objects and advantages of my liquid level gauge invention will become apparent from the following detailed description and the accompanying drawings:

In the drawings, FIG. 1 is a bottom view of the liquid level probe;

FIG. 1a is an enlarged section through the capacitance grid of the liquid level probe of FIG. 1 along the line 1a—1a;

FIG. 2 is a block diagram of the liquid level gauging system;

Figure 3:
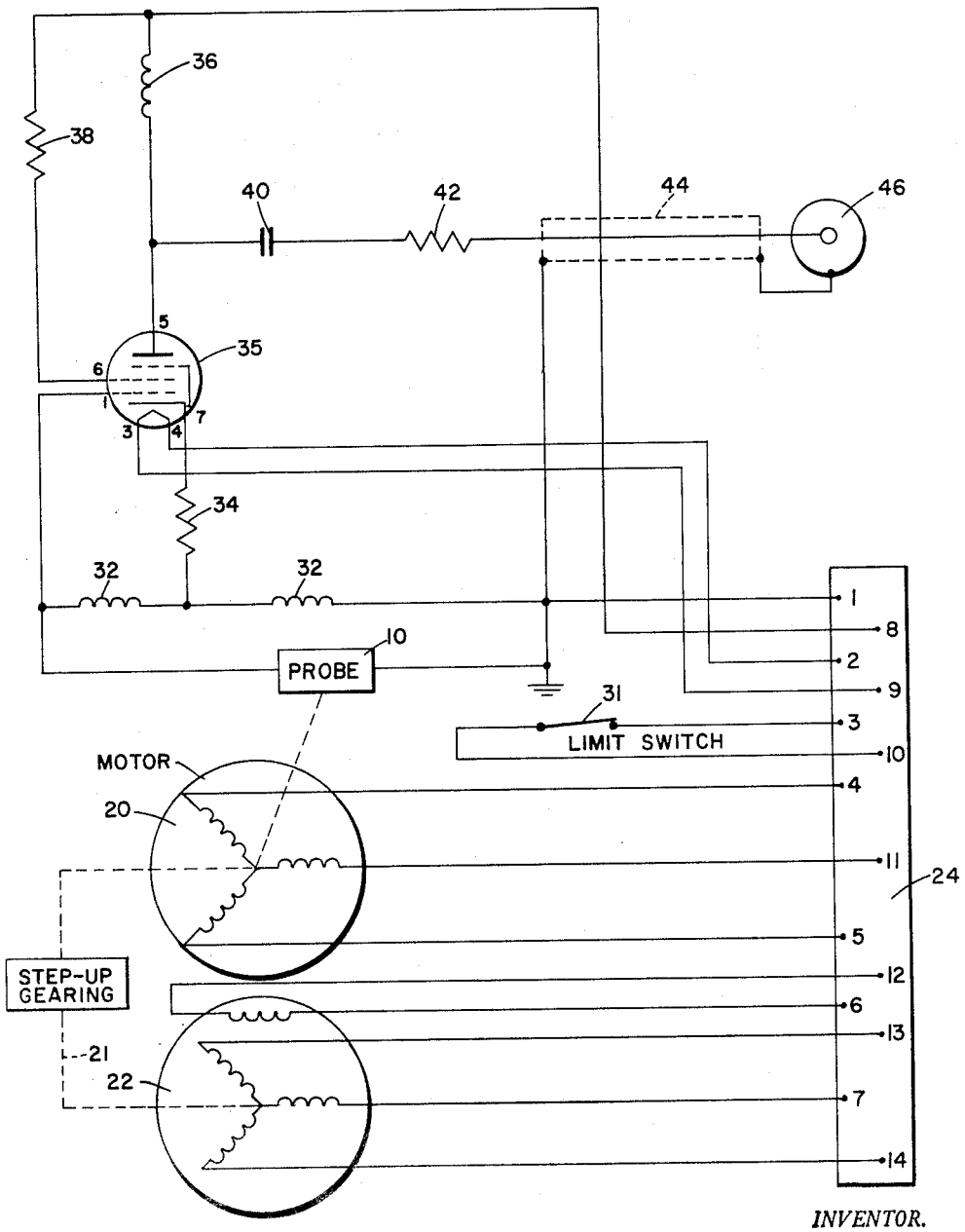
FIG. 3 is a schematic circuit diagram of a portion of the system (the level gauge oscillator and drive unit)

In FIG. 1 the liquid level detector 10 comprises a plurality of small, parallel wires 12 in a generally uniplanar grid arrangement separately connected in two interleaved rows to contact strips 14 and 16 to form a capacitor. The generally uniplanar grid is of stainless steel and is mounted on a ceramic block 18. The probe 10 is mounted on a vertically driven shaft (not shown) to seek the level of the liquid. The probe relies upon the difference between the dielectric constant of air and liquid to detect the surface of the liquid. The plane of the uniplanar grid is kept parallel to the surface of the liquid and moves toward it, and thus the grid contacts the liquid surface along its entire face when it reaches the liquid. Surface tension causes the liquid to rise between the grid wires, thereby further defining the contact. A sharp, very substantial increase in the capacitance of the grid is thus obtained when the detector reaches the liquid. Liquids have a greater dielectric constant than gases, so the capacitance of the grid is greater in a liquid than in a gas. The present probe is in considerable contrast to prior probes which were disposed normal to the fluid, in which cases capacitance changed only slowly.

The sharp change in capacitance is then indicated in an associated circuit, shown in the block diagram of FIG. 2, thereby giving the level of the liquid in the vessel. The generally uniplanar grid probe is connected as the tuning capacitor of a capacitance-tuned oscillator. The output of this oscillator, whose frequency is determined by the capacitance of the grid, goes to a tuned circuit. The tuned circuit is sharply tuned so that a small change in the frequency of its input results in a large change in the voltage of its output. The output of the tuned circuit then goes to a meter, and a change in the meter reading indicates that the surface has been reached. From a counter connected with the motor drive for the probe, the numerical value of the liquid level is obtained. In operation, the output of the tuned circuit remains relatively constant until the liquid level surface contacts the grid. The resultant sharp change in the capacitance of the grid causes the frequency of the oscillator to change. This sharp change is then further magnified by the tuned circuit and displayed by the meter, showing the probe is in contact with the liquid.

Since the probe is normally driven very slowly, the counter need not be automatically stopped when the liquid level is reached; the operator can stop the motor (and hence the counter) upon the change in meter reading. The numerical height of the liquid in a vessel, or the distance travelled by the probe (i.e., turns of drive motor) is then read directly off the counter. If an automatic stop is desired, such can be accomplished by providing a conventional flip flop, relay, and brake between the tuned circuit and the drive motor, as shown on the block diagram.

Figure 4:
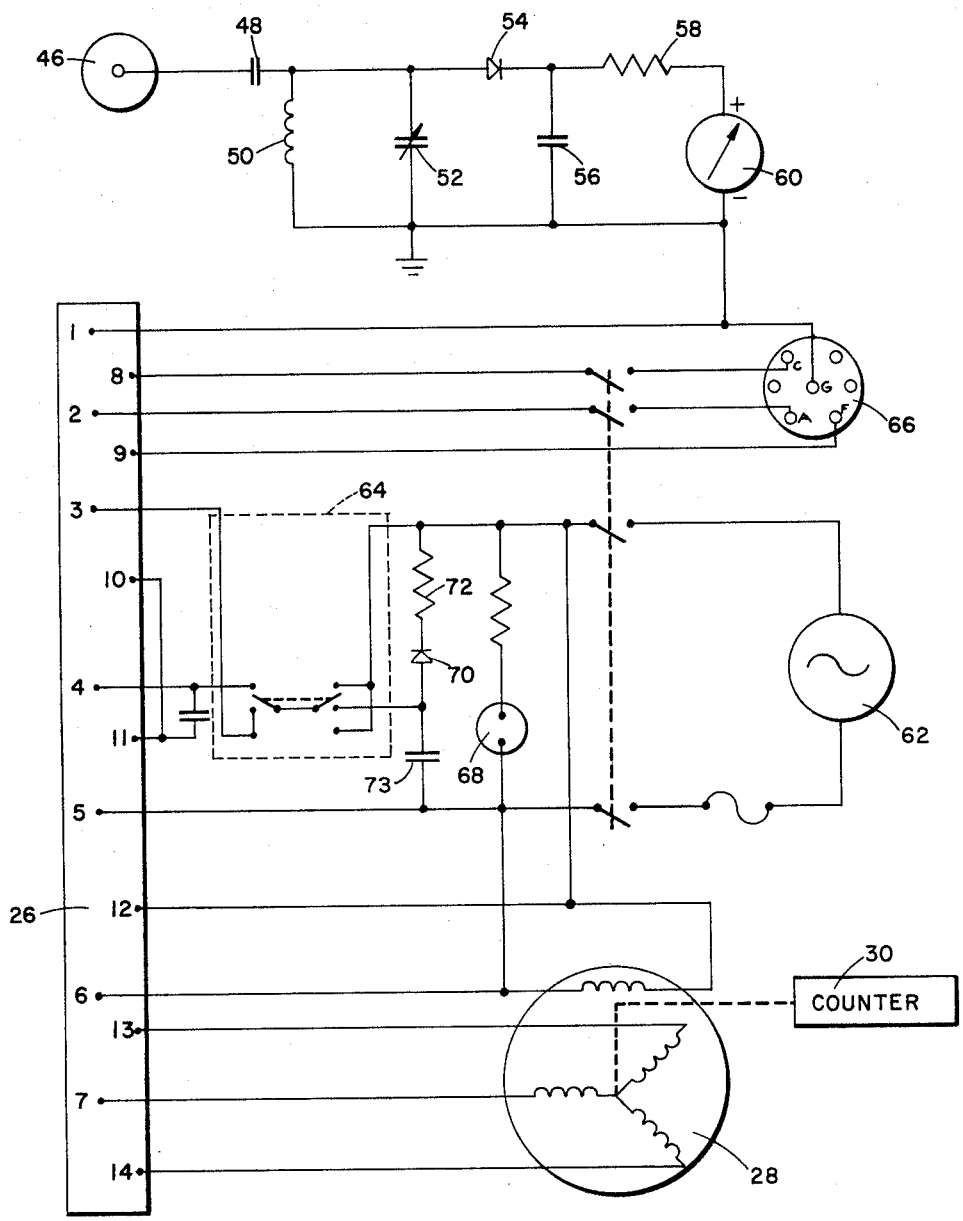
FIG. 4 is a schematic diagram of another portion of the system (the level gauge control unit).

For a detailed description of the operation of the system, reference is now made to FIGS. 3 and 4. The grid is positioned by a rack and pinion turned by a 0.7 r.p.m. A.-C. gear reducer motor 20; control of the motor will be subsequently described. Coupled to the motor shaft is a 100:1 gear reducer used in reverse as a speed increaser. The high speed shaft, schematically illustrated by the dashed line 21, turns a synchro torque transmitter 22 as the remote part of the position indication system. The synchro transmitter is connected through a plug 24 which may be positioned inside a vessel or a remote room to a second plug 26 (FIG. 4) and thence to a synchro receiver motor 28. Where remote operation is not required this part of the system (plugs) can be eliminated and direct connections made between the oscillator and tuned circuit, and between the synchro transmitter and receiver motors. The synchro receiver motor 28 drives a counter 30 which gives the probe position. A micro-switch 31 limits the downward travel of the grid. The limit switch 31 opens when the probe 10 is driven a maximum distance downwards by the motor 20 and thus prevents further energization of the motor for continued downward movement of the probe. However, the motor 20 can be energized to drive the probe 10 upwards.

The grid detector probe 10 is connected as the tuning capacitor of a standard electron coupled LC oscillator through inductances 32 of 0.5 mh. and a resistor 34 of 560 ohms, 2 watts, to a self-biased cathode and a grid of a 6AG5 oscillator tube 35. The B+ for plate 5 of the tube is provided through terminal 8 of plug 24 through a 5 mh. coil 36, into grid 6 through a 43 K., 1 w. resistor 38. The ground return is through terminal 1. The output of the oscillator, the frequency of which is determined by the capacitance of the grid, is transmitted through an R-C coupling network of a 0.01 mfd. capacitor 40 and a 10 meg. resistor 42 through a coaxial cable 44 to a coaxial connector 46 mounted on a junction box on the drive unit. This signal is then transmitted through a 140 mmf. capacitor 48 (FIG. 4) to a capacitor-tuned LC circuit consisting of a 0.5 mh. coil 50 and a 4–52 mmf. tuning capacitor 52. This circuit is tuned so that it is resonant at the frequency generated by the oscillator when the generally uniplanar grid is in the gas phase, thereby giving a maximum output signal. The output of the tuned circuit is rectified through a 1N58A solid state diode 54 and then filtered through an R-C filter consisting of a 250 mmf. capacitor 56 and a 240 K. resistor 58, producing a D.-C. current whose magnitude is determined by the oscillator frequency. This current is indicated on a microammeter 60 (0–50 $\mu$a range).

The control unit of FIG. 4 further contains a power supply 62 for the motors operating through a motor on-off control and direction switch 64. When the three-position switch 64 is in an uppermost switch contact position, power from the power supply 62 is supplied to the drive-motor 20 through terminals 4, 5 and 11 to drive the probe 10 upwards away from the level of the liquid. When the switch 64 is in a lowermost switch contact position, the motor 20 drives the probe 10 towards the level of the liquid. The intermediate switch contact position of switch 64 delivers half-wave rectified current through the stator windings of the motor 20, braking the motor rotation and preventing coasting or drift of the probe 10. Power for the oscillator tube 35 is obtained through a plug 66 connected into another chassis. A pilot light 68 indicates power on-off. The half-wave rectified braking direct current to the drive motor is provided by the diode (3DS1) 70, resistor 72 (1.2 K., 10 w.), and capacitor 73 adjacent the switch 64.

The present remotely operated level gauge has a measuring accuracy about ±0.005 inch. The standard deviation in sixty-two measurements was found to be 0.0048 inch and the extreme deviation in these measurements was 0.012 inch.

It is apparent that modification in this system may be made by those skilled in the art within the scope of my invention, for example, in the circuitry utilizing the capacitance change of the probe to give an indication of the liquid level. Accordingly, my invention should be understood to be limited only as is indicated in the appended claim.

I claim:

A liquid level probe comprising a pair of electrically conductive contact strips, insulating means on which said strips are mounted in spaced relation, a plurality of spaced substantially parallel wires in a uniplanar grid configuration, the spaces between the wires being open for passage of liquid therebetween, one plurality of said wires being connected to one of said contact strips and spaced from the other contact strip and another plurality of said wires being spaced from the first named contact strip and connected to the other of said contact strips to form a capacitor, said wires defining an outward face of said probe, whereby said probe is adapted to initially contact the surface of a liquid in a substantially parallel relationship between the grid face and the liquid surface.

References Cited by the Examiner

UNITED STATES PATENTS

| 2,683,371 | 7/1954 | Droin et al. | 73—304 |
| 2,863,472 | 12/1958 | Coles et al. | 137—392 |
| 2,946,991 | 7/1960 | Lindenberg | 73—304 X |

FOREIGN PATENTS

| 1,024,950 | 1/1953 | France. |

ROBERT B. HULL, *Primary Examiner.*